Fig.17

# United States Patent Office 3,307,561
Patented Mar. 7, 1967

3,307,561
APPARATUS FOR ASSEMBLING COMPONENTS OF TOBACCO-CONTAINING PRODUCTS
Bernhard Schubert, Hamburg-Lohbrugge, and Guenter Wahle, Hamburg-Wellingsbuttel, Germany, assignors to Hauni-Werke Koerber & Co. K.G., Hamburg-Bergedorf, Germany
Filed Mar. 29, 1963, Ser. No. 269,027
Claims priority, application Germany, Dec. 27, 1960, H 41,326; July 29, 1961, H 43,281; Aug. 12, 1961, H 43,395; Sept. 28, 1961, H 43,738
3 Claims. (Cl. 131—94)

This application is a continuation-in-part of our applications Serial Nos. 162,431 and 216,356 filed respectively on December 27, 1961 and August 13, 1962, and now abandoned.

The present invention relates to tobacco processing machines in general, and more particularly to an apparatus for aseembling two or more components of tobacco-containing products. Still more particularly, the invention relates to an apparatus for convoluting adhesive wrappers about two or more end-to-end arranged rod or stick shaped components of tobacco-containing products, for example, for convoluting a wrapper about a single-length or twin-length filter and about one or two tobacco-containing sticks to form filter tip cigarettes.

An important object of the invention is to provide an apparatus of the above outlined characteristics which is capable of rapidly and accurately applying adhesive-coated wrappers to two or more coaxially aligned components of tobacco-containing products, which applies the wrappers in a fully automatic way, and which may be substituted for conventional wrapping apparatus in tobacco processing machines of presently utilized design.

Another object of the invention is to provide an apparatus which is provided with improved wrapping members capable of moving each zone of an adhesive wrapper into full face-to-face contact with the end-to-end arranged components.

A further object of the invention is to provide an improved wrapping drum which may be installed between a source of partly assembled groups of filter tip cigarettes and a source of wrappers to consecutively connect the components of partly assembled groups to each other in a fully automatic way.

An additional object of my invention is to provide an apparatus of the above outlined characteristics which is especially suited for connecting pairwise arranged cigarette sticks with twin-length filters to form twin-length cigarettes which are subsequently halved by forming a cut through the filter and through the wrapper which is convoluted thereabout.

A concomitant object of my invention is to provide novel supporting and reciprocating means for pairwise arranged wrapping members which form part of the improved wrapping or convoluting apparatus.

A further object of the invention is to provide an apparatus of the above outlined characteristics wherein friction between the wrapping members and the groups of end-to-end arranged components is reduced to a minimum and wherein any remaining tobacco particles are automatically removed prior to each wrapping or convoluting operation.

An additional object of the invention is to provide an apparatus which may be rapidly converted for use in assembling of differently dimensioned components of tobacco-containing products.

With the above objects in view, the invention resides in the provision of an apparatus for the manufacture of tobacco-containing products of the type comprising at least two end-to-end arranged elongated stick-shaped components and an adhesive-coated wrapper which is convoluted about the meeting ends of and connects the components to each other. The apparatus comprises rotary conveying means (preferably a drum or a wheel) including a plurality of holding means or trays each having elongated groove means or pockets parallel with the axis about which the conveying means rotates, transfer means for consecutively transferring wrappers and groups of end-to-end arranged components into the pockets so that a portion of each wrapper adheres to and that at least one edge portion of each wrapper extends from the respective group, a plurality of pairwise arranged wrapping members movably mounted on the conveying means and disposed at the opposite sides of the respective groups and having wrapper-engaging faces, and means for reciprocating the wrapping members with respect to the conveying means and with respect to each other so as to roll the groups along the faces of the respective wrapping members and to convolute the edge portion of each wrapper about the respective group.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figures 1, 3, 4:
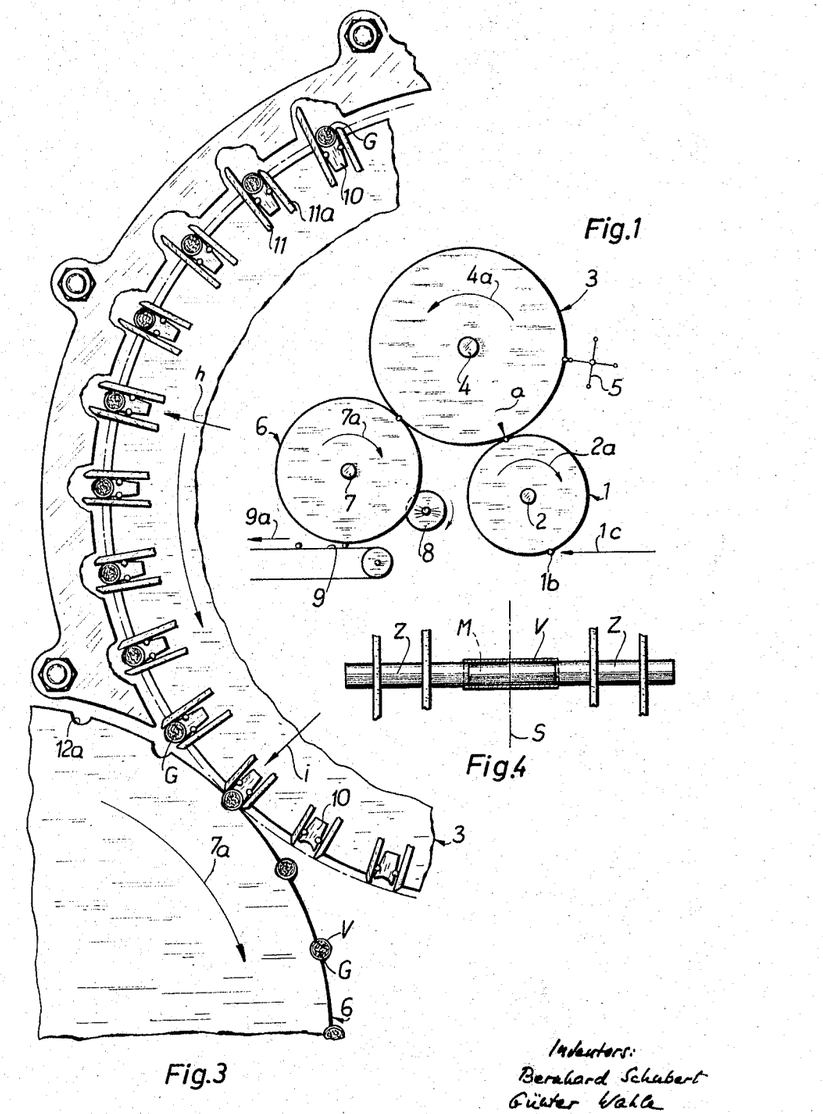
FIG. 1 is a schematic fragmentary front elevational view of an apparatus wherein the conveying means assumes the form of a rotary wrapping drum which is constructed in accordance with one embodiment of our invention.
FIG. 3 is a greatly enlarged front elevational view of the other half of the wrapping drum, showing certain additional processing stations and a second transfer station at which the fully assembled groups are transferred into a different part of the apparatus.
FIG. 4 is an enlarged view of a group of end-to-end arranged components including two spaced tobacco-containing sticks, a twin-length filter between the sticks, and a fully convoluted wrapper which connects the filter with the sticks, showing the manner in which the group is halved by cutting through the wrapper and through the filter to transform the group into a pair of filter tip cigarettes.

Referring now in greater detail to the illustrated embodiments, and first to FIG. 1, there is shown a portion of an apparatus for producing filter tip cigarettes or other types of composite tobacco-containing products. The apparatus comprises a rotary transfer means here shown as a drum 1 which is mounted on a drive shaft 2 and which is formed with axially parallel peripheral pockets 12 (see FIG. 2) each of which may receive a partly assembled group G consisting of two spaced tobacco-containing sticks or rods Z, Z, a twin-length mouthpiece or filter M which is located between and which is arranged end-to-end with the sticks Z, Z, and a wrapper in the form of an adhesive-coated strip V which is tangential and whose median portion adheres to the filter M. The length of the wrapper V exceeds the axial length of the filter M so that the longitudinal end portions of the wrappers overlie the inner end portions of the sticks Z, Z which abut against the end faces of the filter. The transfer drum 1 is driven in a clockwise direction indicated by the arrow 2a to receive in each of its pockets 12 a group G of end-to-end arranged components Z, M, Z and a wrapper V while the pockets travel along a receiving station 1b to which the end-to-end arranged components Z, M, Z are delivered by an assembling drum (not shown) in a direction indicated by arrow 1c. At a point a (hereinafter called first transfer station), the pitch circle of the drum 1 touches the pitch circle of a conveying means or wrapping drum 3 so that the groups G may be transferred from the pockets 12 into the pockets or grooves 10a of consecutive holding or retaining means 10 (hereinafter called trays) which are recessed into the mantle and which extend in the axial direction of the wrapping drum 3. In the embodiment of FIG. 1, the wrapping drum 3 is located at a level above the transfer drum 1 and is driven by or about its shaft 4 so as to rotate in an anticlockwise direction indicated by arrow 4a.

The pitch circle of the wrapping drum 3 is in linear contact with the pitch circle of a receiving drum 6 which is mounted on a shaft 7 and which rotates in a clockwise direction indicated by arrow 7a. This receiving drum is formed with axially parallel peripheral pockets 12a (see FIG. 3) and cooperates with a disk-shaped rotary cutter 8 whose purpose is to cut each twin-length filter M and the corresponding wrapper V along a line S (see FIG. 4) so as to transform each group G into a pair of filter tip cigarettes while the groups are received in the pockets 12a of the drum 6. The cigarettes are thereupon deposited on the upper run of a take-off belt 9 which advances them to a packing station, to storage or to another destination (arrow 9a).

The trays 10 of the wrapping drum 3 cooperate with a pronged star-shaped pressing or retaining wheel 5 which consecutively presses the groups G into the respective grooves 10a so as to prevent radially outwardly directed movement of the respective group in response to radially outwardly directed movement of pairwise arranged rigid wrapping members 11, 11a whose construction and mounting will now be described with reference to FIGS. 2, 3 and 5.

The wrapping members 11, 11a respectively constitute the outer arms of supporting means in the form of two-armed levers 11A, 11B which are respectively provided with pivot pins 13, 13a extending into bores 15, 15a of links 14, 14a. The link 14 is formed with a second bore 16 to receive an axially parallel motion transmitting shaft 17 which is rotatably mounted in one or both end walls 3a of the wrapping drum 3. It will be noted that the link 14 forms a loop about the shaft 17 and its wings are secured to each other by a connecting screw 18. The two wings of this link define a gap 19 which may be narrowed or widened by turning the screw 18 so as to insure that the link will follow all angular movements of the shaft 17 and that it may be readily and rapidly detached therefrom. The pivot pin 13 is rotatable in the bore 15 so that the two-armed lever 11A including the wrapping member 11 is articulatable with respect to the link. The shaft 17 carries a second link 20 which supports a pin 22 for a follower roller 21, the latter received in a suitably configurated cam groove or slot 23 of a stationary cam 23A so that the shaft 17 is rocked in a predetermined sequence when the drum 3 rotates with respect to the cam 23A whereby the wrapping member 11 performs controlled radially inwardly or outwardly directed movements with respect to the tray 10. The inner arm of the lever 11A is connected to a biasing means in the form of a helical spring 24 which is secured to the drum 3 to act in a direction indicated by arrow 25 and which tends to pivot the lever 11A about the pin 13 in a direction to maintain the inner face of the wrapping member 11 in abutment with a roller-shaped rotary stop 26 carried by and extending laterally beyond the respective tray 10.

The pin 13a of the other lever 11B is mounted in the bore 15a provided at the free end of the second link 14a. This link is formed with a second bore 16a which receives a second motion transmitting shaft 17a and the link is clamped to the shaft 17a by a screw 18a so that the latter may control the width of the gap 19a formed between the wings of the link 14a. The shaft 17a is connected with a second link or bracket 20a whose pin 22a carries a roller follower 21a received in a suitably configurated cam groove or slot 23a provided in a disk-shaped stationary plate cam 23B. The inner arm of the lever 11B is biased by a helical spring 24a which acts in a direction indicated by arrow 25a so as to maintain the inner face of the wrapping member 11a in abutment with a second roller-shaped rotary stop 27 on the tray 10.

Figure 5:
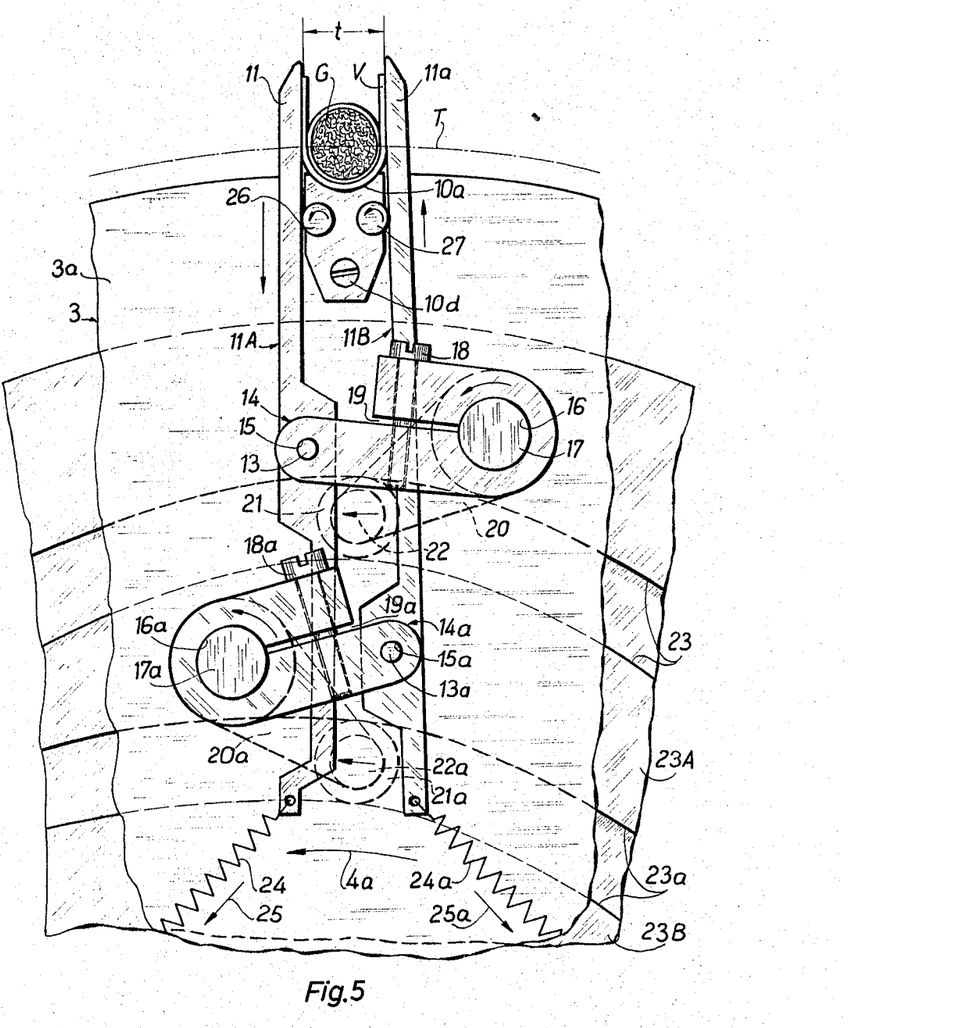
FIG. 5 is a greatly enlarged front elevational view showing two radially reciprocable wrapping members which are mounted in the wrapping drum and further showing the means which is utilized for supporting and for reciprocating the wrapping members in a predetermined sequence so that the inner faces of these members roll a group and convolute the edge portions of the wrapper about the filter while the group travels with the revolving wrapping drum.

It will be noted that each of the levers 11A, 11B is respectively pivotable about the axis of the pivot pin 13, 13a, that these levers are free to "float" with respect to the wrapping drum, and that their wrapping members 11, 11a are permanently biased into abutment with the stops 26, 27 so that the inner faces of these wrapping members automatically engage the wrapper V when compelled by the cams 23A, 23B to assume the positions of FIG. 5 in which they project radially outwardly beyond the groove 10a of the tray 10. The width of the trays is slightly less than the diameter of a group G so that the filters M are at least slightly compressed when the respective wrappers V are engaged by the inner faces of the wrapping members 11, 11a. It was found that very good results can be attained if the stops 26, 27 are arranged in such a way that the distance $t$ between the inner faces of the wrapping members 11, 11a, as measured in the equatorial plane T passing through the axis of a group G, is just a fraction of a millimeter less than the diameter of the group G in the latter's uncompressed or undeformed condition. The difference may be in the range of 0.5–0.8 mm. which is sufficient to deform the originally circular group G so that the filter M and the adjacent end portions of the tobacco-containing sticks Z, Z assume an oval shape whereby the area of contact between the inner faces of the wrapping members 11, 11a and the outer side of the wrapper V is increased considerably. This is of advantage during the wrapping operation.

Figures 2, 7:
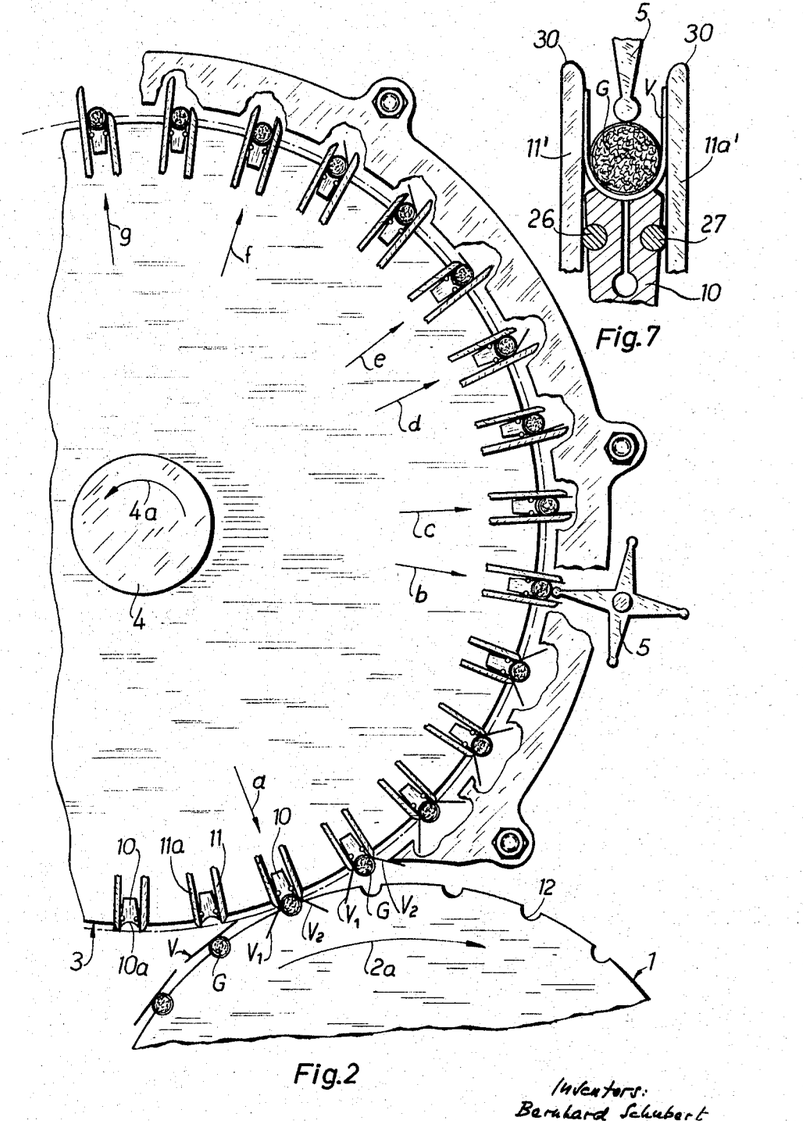
FIG. 2 is a greatly enlarged front elevational view of one half of the wrapping drum, showing a first transfer station and a series of processing stations at which adhesive-coated wrappers are convoluted onto groups of end-to-end arranged components forming part of or constituting tobacco-containing products.
FIG. 7 illustrates a pair of slightly modified wrapping members which may be utilized in the apparatus of FIGS. 1 to 5.
Figure 6A:
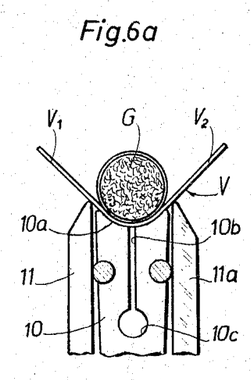
FIGS. 6a to 6i illustrate various stages of the wrapping operation beginning with transfer of groups into peripheral pockets of the wrapping drum and terminating with transfer of fully assembled groups onto or into the next part of the apparatus.

The wrapping arrangement of the apparatus shown in FIGS. 1 to 5 operates as follows:

As shown in FIG. 2, the transfer drum 1 advances the groups G in such a way that the sticks Z,Z and the filter M are partially received in the respective pockets 12 and that the wrappers V are substantially tangential to and are spaced from the periphery of the transfer drum. At the first transfer station $a$, the wrapping members 11, 11a associated with the tray 10 momentarily located at this station are retracted radially inwardly (see FIG. 6a) so that the groove 10a of this tray may receive the group G from the aligned pocket 12 in such a manner that the wrapper V is adjacent to the wall bounding the groove 10a. FIG. 6a shows that the tray 10 is provided with suction channels 10b, 10c which are maintained at subatmospheric pressure so as to make sure that the group G is retained in the groove 10a. During such transfer of the group G from a pocket 12 into the aligned groove 10a at the transfer station $a$, a median portion of the adhesive-coated inner side of the wrapper V is caused to adhere to a surface portion of the filter M and to surface portions of the sticks Z,Z, and the combined area of such surface portions equals the area of the wall bounding the groove 10a.

Figure 6B:
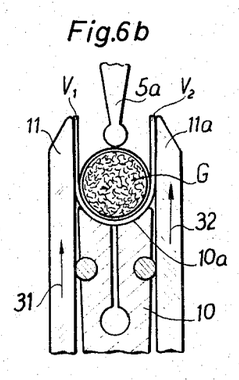

As the wrapping drum 3 continues to rotate in a direction indicated by arrow 4a, the group G advances from the transfer station $a$ to a second station $b$ which is adjacent to the pressing wheel 5. The movements of the drum 3 and of the wheel 5 are synchronized in such a way that one prong of the wheel engages and presses the group G against the tray 10 when the group G reaches the second station $b$. At the same time, the cams 23A, 23B cause the wrapping members 11, 11a to move radially outwardly (arrows 31, 32 in FIG. 6b) so as to respectively deflect the loose edge portions or flaps $V_1$, $V_2$ of the wrapper V into substantial parallelism with each other. In other words, while at the station $b$ the wrapping members 11, 11a perform a simultaneous radially outwardly directed movement to deflect the wrapper V into contact with about one-half the periphery of the filter M. The wrapper V remains in abutment with the wall bounding the respective groove 10a because the prong 5a of the wheel 5 prevents it from following simultaneous radially outwardly directed movements of the wrapping members 11, 11a. As explained hereinabove, the distance between the wrapper-engaging inner faces of the members 11, 11a is less than the diameter of a group G in unstressed condition thereof so that, while moving radially outwardly as indicated in FIG. 6b by arrows 31, 32, the wrapping members 11, 11a deform the group G to insure that the wrapper adheres to the filter M and to the adjacent end portions of the sticks Z,Z.

Figure 6C:
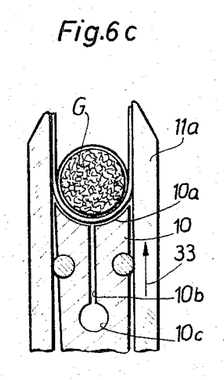

As soon as a selected group G is moved beyond the second station $b$ and is released by the wheel 5, the wrapping member 11a begins to advance radially outwardly with respect to the wrapping member 11 (arrow 33) whereby the group G is rolled away from actual abutment with the tray 10 so that a slight gap or clearance develops between the outer side of the wrapper V and the groove 10a (see FIG. 6c). The group G is now assumed to be at the processing station $c$ which is located at the downstream side of and which is adjacent to the station $b$. The advantage of the clearance shown in FIG. 6c is that there is no friction between the group G and the respective tray 10 in the next stages of the wrapping operation. The channels 10b, 10c are now free to communicate with the atmosphere so that, as soon as it reaches the station $c$, the group G is not drawn against the respective holder 10 and is held solely by the wrapping members 11, 11a under the action of the springs 24, 24a.

Figure 6D:
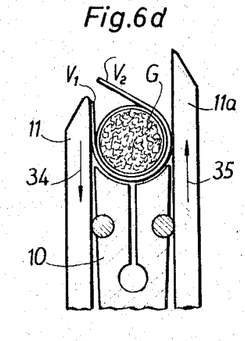
Figure 6E:
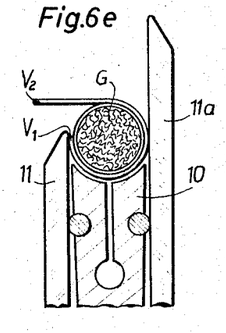

The group G then advances beyond the station $c$ and toward a fourth station $d$ which is shown in FIGS. 2 and 6d. While advancing between the stations $c$ and $d$, the wrapping members 11, 11a are moved in opposite directions (arrows 34, 35) so that the member 11 moves radially inwardly, that the member 11a moves radially outwardly and that the group G rolls between the inner faces of these members whereby the inner face of the wrapping member 11 begins to wrap the left-hand edge portion $V_1$ of the wrapper V about the group G while the other edge portion $V_2$ is simultaneously pivoted in a direction away from the inner face of the wrapping member 11a. When the tray 10 reaches the next station $e$ (FIGS. 2 and 6e), the tip of the wrapping member 11 is moved in close proximity of the filter M and the entire edge portion $V_1$ is caused to adhere to the respective group G. The edge portion $V_2$ is now substantially tangential to the pitch circle of the drum 3.

Figure 6F:
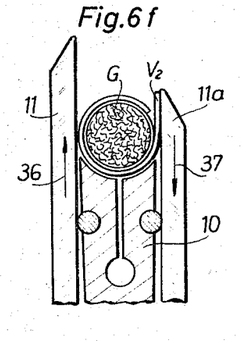
Figure 6G:
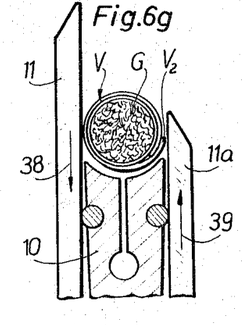

The configuration of the cam slots 23, 23a is such that the cams 23A, 23B compel the wrapping members 11, 11a to reverse the direction of their movement (arrows 36, 37 in FIG. 6f) as soon as the respective tray 10 leaves the station $e$ and advances toward the next station $f$ (FIG. 2), whereby the inner face of the wrapping member 11a begins to roll the edge portion $V_2$ about the group G and the rolling of the edge portion $V_2$ is completed when the respective tray 10 reaches the station $g$ (FIGS. 2 and 6g). It will be noted that the width of the wrapper V is selected with a view to make sure that the edge portion $V_2$ overlaps the edge portion $V_1$ in a manner shown in FIG. 6g so that the wrapper forms an airtight seal about the filter M and also between the filter and the adjacent inner end portions of the sticks Z, Z.

Figure 6H:
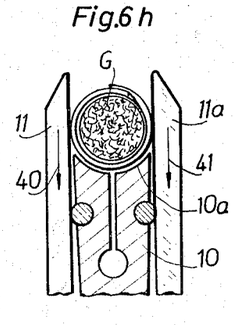

The tray 10 continues to advance toward the next station $h$ (FIGS. 3 and 6h) while the wrapping members 11, 11a move in opposite directions (arrows 38, 39 in FIG. 6g) so that the convoluted wrapper V is caused to roll once more between and along the inner faces of the wrapping members and that the outermost zone of the edge portion $V_2$ is properly bonded to the outer side of the overlapped zone of the edge portion $V_1$. At or shortly ahead of the station $h$, the cams 23A, 23B move the members 11, 11a into a position in which their tips are at the same level. The overlapping zone of the edge portion $V_2$ is then located substantially midway between the wrapping members and diametrically opposite the respective groove 10a.

Figure 6I:
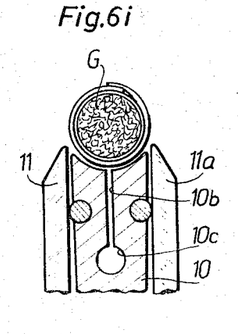

The wrapping members 11, 11a now begin to move radially inwardly (arrows 40, 41 in FIG. 6h) and are withdrawn to the position of FIG. 6i in which the tray is aligned with a pocket 12a of the receiving drum 6 at a second transfer station $i$ (FIG. 3). While moving from the processing station $h$ to the transfer station $i$, the channels 10b, 10c may be connected to a vacuum generating apparatus so as to make sure that the fully assembled group G remains in its groove 10a even if the wrapping members are retracted before reaching the station $i$. At the station $i$, the group G is transferred into the aligned pocket 12a in any suitable way, for example, by admitting air to the channels 10b, 10c and by simultaneously sucking the group G into the pocket 12a.

The groups G travel with the drum 6 (arrows 7a) into the range of the rotary cutter 8 which severs the convoluted wrapper V and the filter M along the line S (FIG. 4) to divide the groups G into pairs of filter tip cigarettes which are deposited on the belt 9 to advance in a direction indicated by arrow 9a.

It will be noted that the springs 24, 24a merely maintain the wrapping members 11, 11a in abutment with the stops 26, 27 and that radial movements of the wrapping members are brought about solely by the cams 23A, 23B through the respective motion transmitting means 13–22, 13a–22a. The cams 23A, 23B and the motion transmitting means 13–22, 13a–22a together constitute means for reciprocating the wrapping members in a sequence as described in connection with FIGS. 2, 3 and 6a–6i so that the wrapping members may selectively engage, lift, roll and disengage the groups G in a given sequence during advance of the groups G between the transfer stations a and i.

The trays 10 are detachable from the drum 3 (see the screw bolt 10d in FIG. 5) so that they may be replaced by different trays if the drum is utilized for applying wrappers to differently dimensioned stick-shaped components of tobacco-containing products.

FIG. 7 illustrates a pair of slightly modified wrapping members 11', 11a' whose tips 30 are rounded to insure that the wrapping members cannot damage or destroy the wrapper V when the latter advances along the station e or g, i.e., when the tips 30 come into actual contact with the wrapper. The inner faces of the wrapping members 11, 11a or 11', 11a' are preferably knurled, corrugated, perforated or otherwise roughened to prevent slippage between the wrapper and the wrapping members. By utilizing wrapping members of the type shown in FIG. 7, pressure exerted by the wrapping members against the groups G may be increased to insure stronger adherence of the wrapper, i.e., the distance t shown in FIG. 5 may be reduced by utilizing smaller-diameter stops 26, 27.

Figure 8:
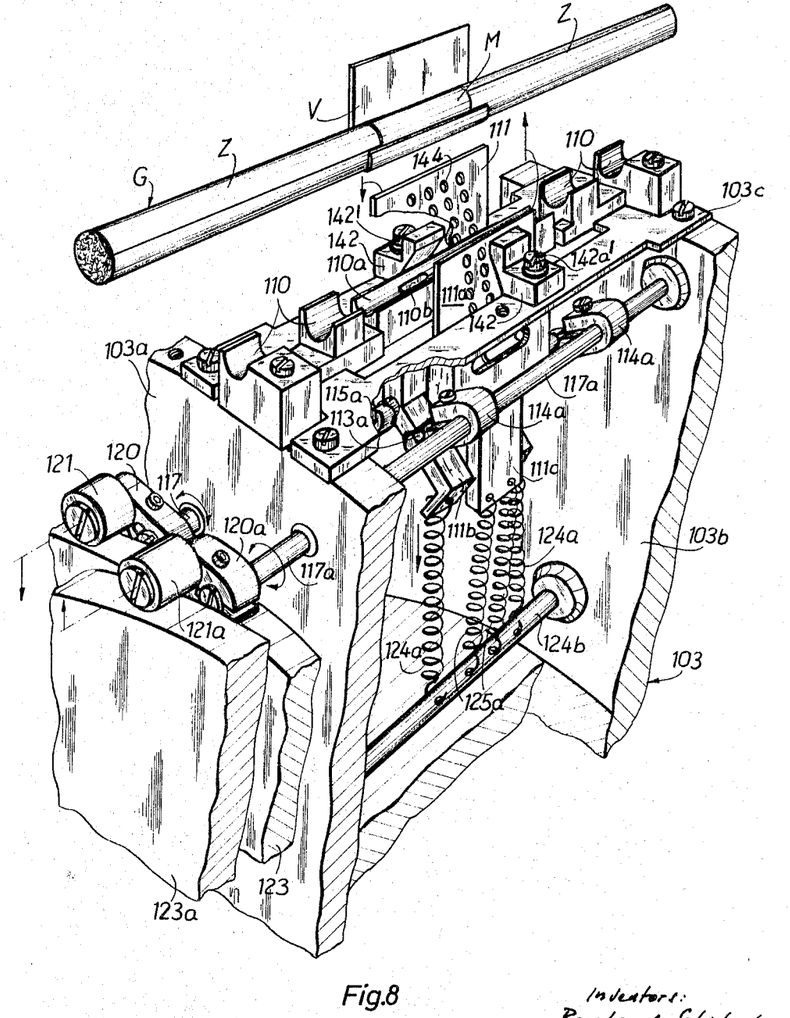
FIG. 8 is a fragmentary perspective view of a modified conveying means which assumes the form of a rotary wrapping drum comprising several pairs of radially reciprocable wrapping members which are detachable from the drum.
Figures 9, 10, 11:
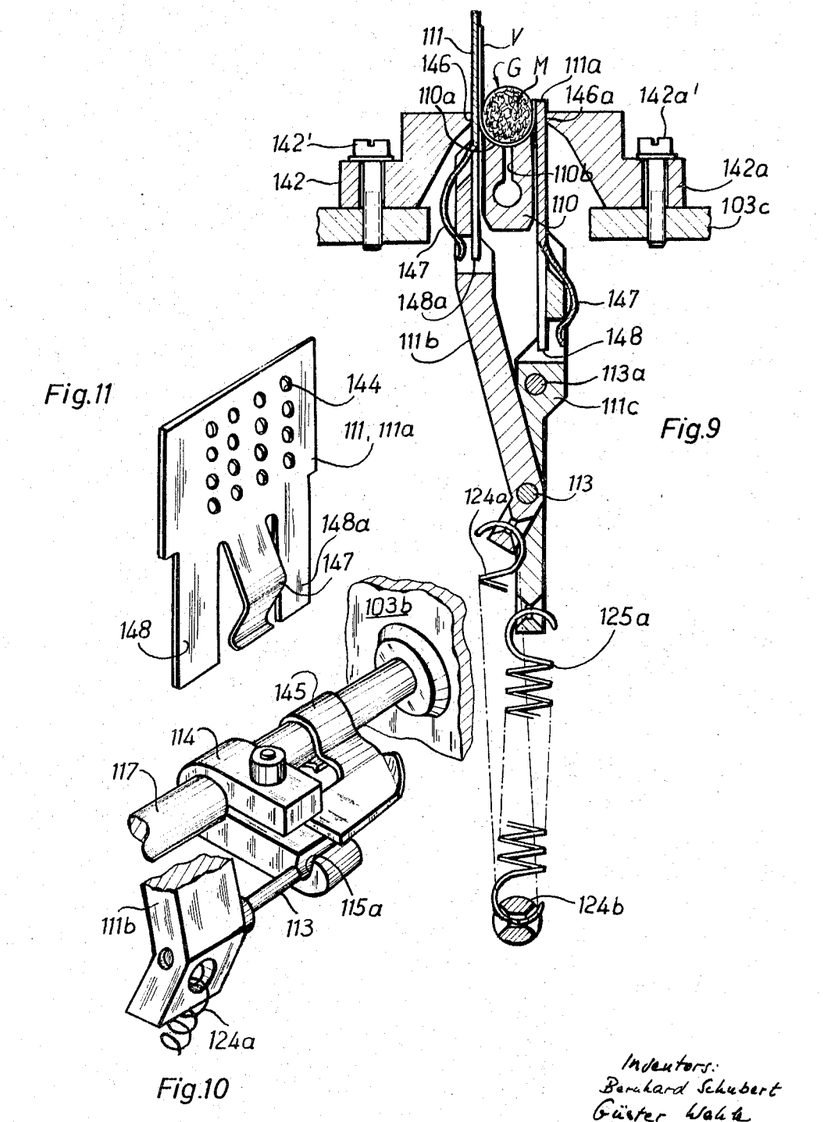
FIG. 9 is an enlarged section through a pair of cooperating wrapping members which are utilized in the wrapping drum of FIG. 8, further showing a pair of two-armed levers which constitute supporting means for and which transmit motion to the wrapping members.
FIG. 10 is a fragmentary perspective view of a detail of the structure illustrated in FIG. 8, showing the manner in which the supporting means for the wrapping members may be detachably mounted in the wrapping drum.
FIG. 11 is a perspective view of a wrapping member of the type utilized in the apparatus of FIGS. 8 to 10.

FIGS. 8–11 illustrate a modified wrapping assembly which includes a conveying means in the form of a hollow rotary drum 103 corresponding to the drum 3 of FIG. 1. The wrapping members 111, 111a (only two are shown in FIGS. 8 and 9) assume the form of substantially rectangular flat plates of resilient metallic material and are detachably connected to the respective supporting means or levers 111b, 111c. These levers reciprocate the wrapping members radially inwardly and outwardly with respect to the axis of the drum 103 so as to apply a wrapper V in the same manner as described in connection with FIGS. 6a–6i. The wrapping members 111, 111a are respectively secured to the longer outer arms of the levers 111b, 111c, and the shorter inner arms of these levers are respectively biased by pairwise arranged helical springs 124a, 125a so as to pivot the levers about the pins 113, 113a in directions to move the wrapping members away from each other, i.e., away from the associated tray 110. The inner ends of the springs 124a, 125a are anchored in an axially parallel bar 124b which is mounted in and extends between the end walls 103a, 103b of the drum 103. Of course, one such bar 124b is provided for each pair of wrapping members 111, 111a.

The pins 113, 113a are respectively received in open slots 115a of pairwise arranged links 114, 114a (only one link 114 shown in FIG. 10) which are mounted on motion transmitting shafts 117, 117a, in the same manner as described in connection with the links 14, 14a and shafts 17, 17a, of FIG. 5. The shafts 117, 117a are freely turnable in the end walls 103a, 103b and extend beyond the end wall 103a where they are connected with links 120, 120a supporting follower rollers 121, 121a which respectively track the peripheries of two stationary plate cams 123, 123a. The configuration of the cams 123, 123a is selected in such a way that these cams compel the wrapping members 111, 111a to move with or with respect to each other in a rhythm necessary to convolute the wrappers V about the groups G. The wrapping members move radially with respect to the axis about which the drum 103 rotates and their inner faces are substantially parallel with each other.

Since the springs 124a, 125a bias the levers 111b, 111c and the wrapping members in directions away from the respective tray 110, means must be provided to counteract the bias of the springs and to insure that the wrapping members engage the wrapper V. This means assumes the form of two adjustable stops or blocks 142, 142a which are adjacent to the outer faces of the wrapping members and are respectively fixed to the mantle 103c of the wrapping drum by bolts 142', 142a'. The elongated stop faces or edge faces 146, 146a of the blocks 142, 142a are closely adjacent to the tray 110 so that the distance between the inner faces of the wrapping members 111, 111a is somewhat less than the diameter of a group G in the latter's undeformed or uncompressed condition. The tray 110 extends in the axial direction of the wrapping drum and consists of several sections (see FIG. 8) whose combined length may but need not equal the length of a group G. The median section of the tray 110 is formed with one or more suction channels 110b which communicate with the groove 110a so that a group G may be retained in the groove 110a even if the wrapping members 111, 111a are completely or nearly completely withdrawn into the drum 103.

The wrapping action of the members 111, 111a is further improved by the provision of perforations 144 (FIG. 11) and also because they consist of elastically deformable material so that they act as leaf springs. Therefore, the wrapping members may compensate for any undesirable play of the links 114, 114a and the perforations 144 insure that the inner faces of the wrapping members are less likely to slide with respect to the wrappers or vice versa, i.e., they contribute to greater friction between the wrapper and the wrapping members. Of course, a similar result may be achieved if the inner faces of the wrapping members are knurled, corrugated or otherwise roughened to prevent slippage along the wrapper.

As shown in FIGS. 9 and 11, the inner end portion of each wrapping member 111, 111a is provided with a resilient tongue or lip 147 disposed between a pair of flat platelike extensions 148, 148a, and the parts 147, 148, 148a together constitute means for detachably securing the members 111, 111a to the levers 111b, 111c, respectively. FIG. 9 shows that the extensions 148, 148a are adjacent to the inner sides of the respective levers and that the lips 147 engage the outer sides of the levers to hold the wrapping members in requisite position. If the operator desires to remove a wrapping member, he grasps the outer portion which is formed with perforations 144 and exerts a pull radially outwardly so as to separate the lip 147 and the extensions 148, 148a from the outer arm of the respective lever.

The provision of open slots 115a enables an operator to remove the supporting levers 111b, 111c for the purpose of inspection, cleaning or repair. When the drum 103 is in actual use, the pins 113, 113a are retained in the respective slots 115a by suitable locking means or shields 145 (FIG. 10) which are movable along the shafts 117, 117a.

It will be noted that, while the manner in which the wrapping members 111, 111a cooperate with each other to convolute the wrappers V about the respective groups G is the same as described in connection with FIGS. 6a–6i, the members 111, 111a do not form integral parts of the supporting levers and they are propped from the outside (blocks 142, 142a) rather than from the inside as in FIGS. 1–3 and 5–7. Also, the springs 124a, 125a tend to move the members 111, 111a away from the respective trays 110 so that the wrapping members bear against the respective blocks.

By adjusting the position of the blocks 142, 142a, an operator may rapidly convert the drum 103 for application of wrappers to stick-shaped components whose diameters are greater or smaller than the diameters of components Z, M, Z shown in FIG. 8.

Figures 12, 14:
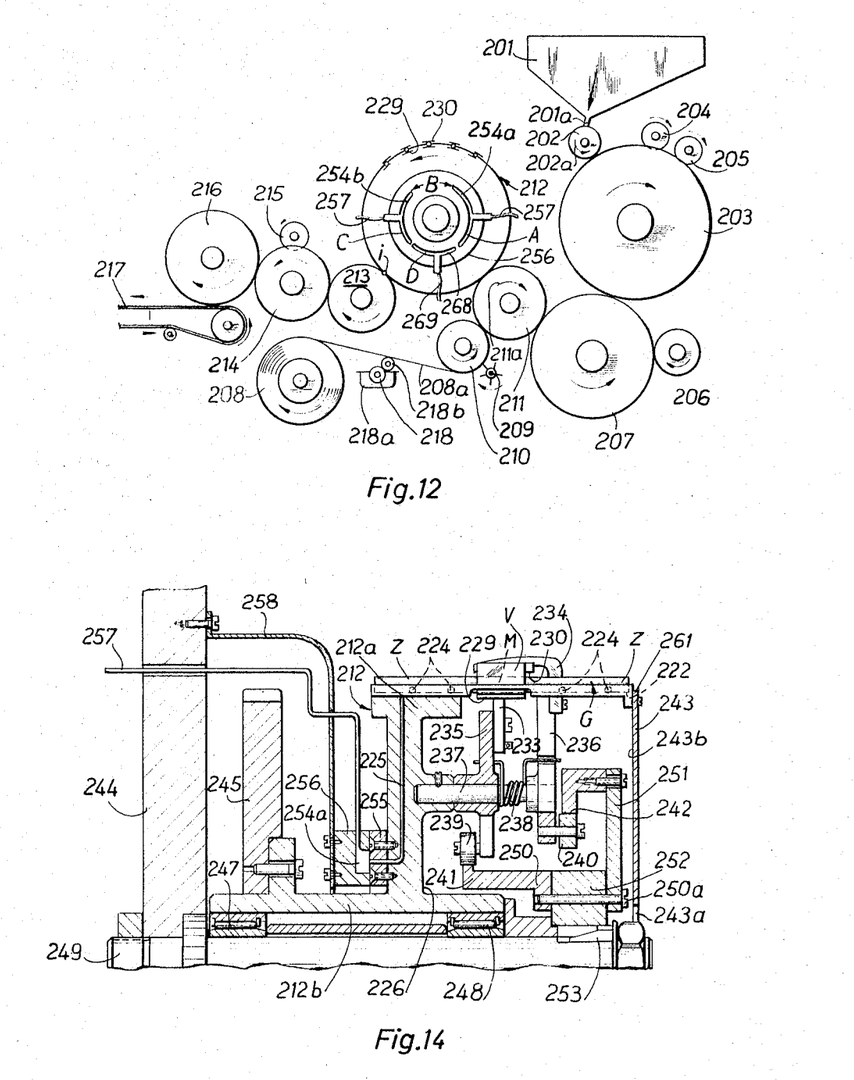
FIG. 12 is a schematic front elevational view of an apparatus for producing filter tip cigarettes comprising a conveying means in the form of a rotary wrapping drum which is constructed in accordance with a third embodiment of my invention and which is provided with pairs of tangentially movable wrapping members.
FIG. 14 is a fragmentary axial section through the wrapping drum of FIGS. 12 and 13.
Figure 13:
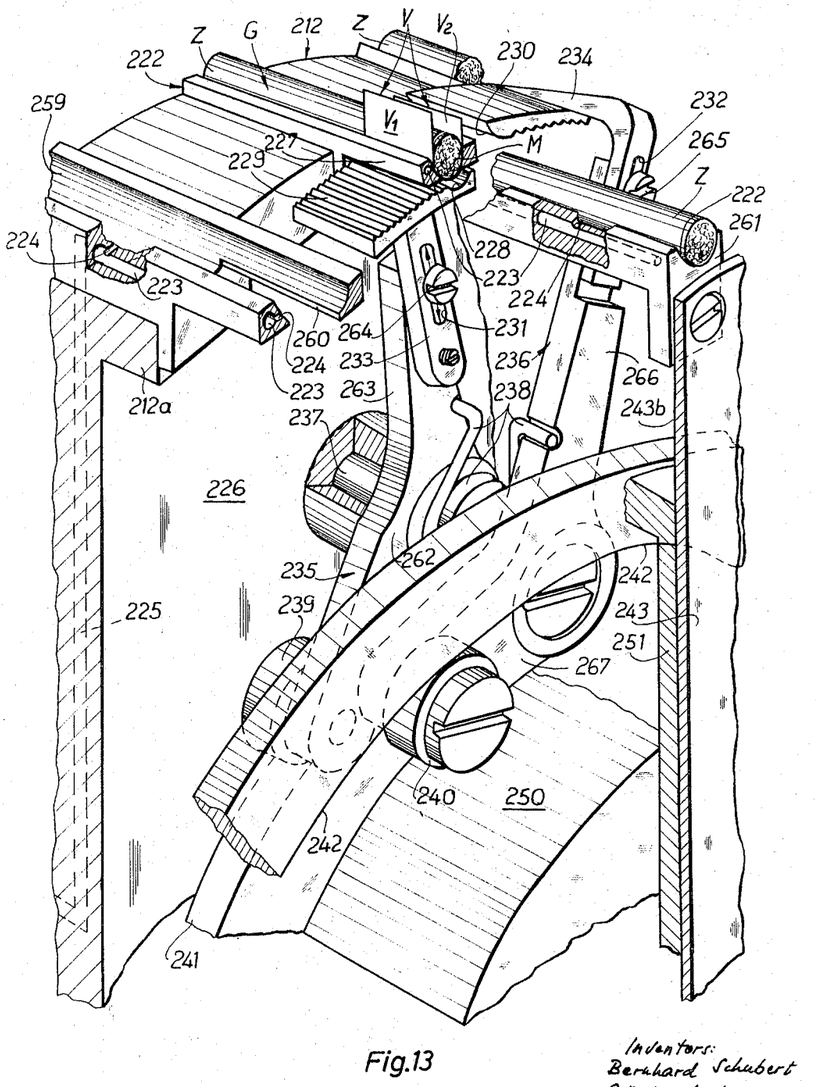
FIG. 13 is a fragmentary perspective view of the wrapping drum which is shown in FIG. 12.

FIGS. 12 to 14 illustrate a further embodiment of my invention which utilizes arcuate wrapping members 229, 230 extending and movable substantially tangentially with respect to the periphery of the conveying means or wrapping drum 212. Referring first to FIG. 12, there is shown an apparatus for the production of filter tip cigarettes which compromises a source of multiple-length filters in the form of a hopper 201 provided with a chute 201a through which multiple-length filters are consecutively discharged into peripheral grooves of a counter drum 202 which rotates in a direction indicated by arrow 202a and delivers filters to a staggering drum 203. The latter cooperates with rotary cutters 204, 205 which are axially offset with respect to each other and which divide the multiple-length filters into twin-length filters or mouthpieces. The drum 203 staggers the filters so that they form a single row and are consecutively transferred into peripheral pockets of a rotary assembling drum 207. The drum 207 cooperates with a supply drum 206 which is provided with axially parallel peripheral pockets to deliver into each pocket of the drum 207 a pair of spaced tobacco-containing sticks in such a way that a filter is always located between a pair of sticks. The drum 207 delivers the groups G consisting of pairwise arranged axially aligned sticks and of a filter therebetween into the peripheral grooves of a transfer drum 211 which corresponds to the drum 1 of FIG. 1 and which cooperates with a wrapper-applying drum 210. This drum receives a paper tape 208a from a reel 208 and delivers the tape into the range of a rotary cutter 209 which is provided with radially extending blades to cut the tape into wrappers of requisite length which are thereupon applied to the filters of the groups advancing with the drum 211 in a direction indicated by arrow 211a toward the transfer station W between the drum 210 and the transfer drum 211. The underside of the tape 208a (as viewed in FIG. 12) is coated with an adhesive paste which is contained in a tank 218a and which is withdrawn from this tank by a paste roll 218 and a paste applying roll 218b.

The drum 211 transfers the groups (each of which is now provided with a wrapper) into the grooves of trays provided on the wrapping drum 212 whereon the wrappers are convoluted in a manner to be described hereinafter so that the convoluting operation is completed before the groups leave the wrapping drum. The latter delivers the groups onto a counter drum 213 which advances the groups into the pockets of a drum 214 cooperating with a rotary cutter 215 so that the cutter halves the convoluted wrappers and the filters in order to transform each group into a pair of filter tip cigarettes. The filter tip cigarettes are then transferred into a reversing drum 216 which aligns them prior to delivering the ultimate products onto the upper run of a take-off belt 217 which advances the cigarettes to a packing station or to storage, not shown.

The construction of the apparatus shown in FIG. 12 is known and, save for the construction of the wrapping drum 212, this apparatus forms no part of my invention. It was described with the purpose of facilitating full understanding of the invention which resides in special construction, mounting and operation of pairwise arranged wrapping members 229, 230 carried by the wrapping drum 212.

As shown in FIGS. 13 and 14, the mantle 212a of the drum 212 carries a plurality of axially parallel holding means or trays 222 whose length equals or approximates the length of a group G including two sticks Z, Z and a filter M. One end of each tray 222 is flush with or is closely adjacent to the left-hand end face of the mantle 212a, as viewed in FIG. 14, and the trays extend to the right and beyond the right-hand end face of this mantle. The axial length of the mantle 212a approximates one-third of the length of a tray 222, and the rightmost end portions 261 of the trays are secured to a radial wall member 243 which is provided with a concentric opening 243a for a stationary supporting shaft 249 of the wrapping drum 212. The wall member 243 and a web 226 of the drum 212 define between themselves an annular chamber 243b which accommodates certain component parts of the means which support and which reciprocate the pairwise arranged wrapping members 229, 230.

The outer sides of the trays 222 are provided with longitudinally extending concave pockets or grooves 259 (FIG. 13) which receive the groups G. The median portion 227 of each tray is provided with an elongated cutout or slot 260 whose length exceeds at least slightly the length of a wrapper V, and each tray is further provided with a longitudinally extending suction channel 223 which communicates with the respective groove 259 through connecting channels or ports 224. In addition, each channel 223 communicates with a radial channel 225 provided in the web 226 of the drum 212 and leading to an evacuated chamber 254a which is shown in FIG. 14.

The compartment 243b accommodates a plurality of supporting means in the form of two-armed levers 235, one for each wrapping member 229, which are turnably mounted on stub shafts 237 secured to the web 226. Only one shaft 237 and only one lever 235 is shown in FIG. 13 since the construction and mounting of all shafts 237 and of all levers 235 are identical. The inner arm 262 of the lever 235 carries a follower roller 239 which is biased into engagement with the periphery of a stationary plate cam 241. The outer arm 263 of the lever 235 carries a removable screw bolt 264 which passes through an elongated slot 231 provided in an angular bracket 233 which is integral with or which is connected to the wrapping member 229. The screw bolt 264 enables an operator to remove or to adjust the position of the wrapping member 229. It will be noted that this wrapping member is located inwardly of the cutout 260 provided in the associated tray 222 (i.e., below the median portion 227) and that its outer face is provided with longitudinally extending corrugations to prevent slippage with respect to a wrapper V. In additon, the outer face of the member 229 is provided with a longitudinally extending shallow groove 228 which is complementary to and is aligned with the groove 259 of the associated tray 222 when the wrapping member 229 assumes the idle position of FIG. 13. The advantage of such construction is that the group G is automatically in optimum position for the subsequent wrapping operation since the filter M comes to rest in the groove 228. In other words, the wall bounding the groove 228 forms part of the holding means for the group G.

The shaft 237 supports a second supporting means in the form of a two-armed lever 236 which is located between the lever 235 and the wall member 243 and whose inner arm 267 carries a follower roller 240 which faces the wall member 243 and cooperates with a second stationary plate cam 242 which is mounted in the compartment 243b. The outer arm 266 of the lever 236 is connected with an angular bracket 234 which carries the second wrapping member 230 so that the latter is outwardly adjacent to the wrapping member 229 and that its corrugated inner face is spaced from the outer face of the member 229 through a distance substantially corresponding to but preferably somewhat less than the diameter of a group G. The connection between the bracket 234 and the arm 266 comprises a screw bolt 265 which extends through an elongated slot 232 provided in the bracket 234 and which is screwed into a tapped bore provided in the arm 266. Thus, the bracket 234 and the wrapping member 230 may be readily adjusted with respect to or detached from the arm 266.

Intermediate the levers 235, 236, the shaft 237 supports a helical torsion spring 238 whose terminals respectively engage the arms 263, 266 to bias the levers in opposite directions and to maintain the follower rollers 239, 240 in engagement with the faces of the cams 241, 242. The cam 241 is mounted on a stationary carrier 250 which is secured to an annular member 252 by bolts 250a, and the annular member 252 is non-rotatably secured to the stationary shaft 249 by one or more wedges or keys 253. The cam 242 is mounted on a second carrier 251 which is rigidly secured to the annular member 252 by the aforementioned bolts 250a.

As explained hereinabove, the outer face of the wrapping member 229 is located directly below the cutout 260 in the median portion 227 of the tray 222 so that, in the position of FIG. 13, the groove 228 in the outer face of the wrapping member 229 is aligned with the groove 259, i.e., the groove 228 is then located between the two sections of the groove 259 which are separated from each other by the cutout 260. In FIG. 13, the wrapping members 229, 230 are assumed to be in idle position in which the inner wrapping member 229 is not overlapped by the outer wrapping member so that the groove 259 is open to receive a group G in such a way that the edge portions $V_1$, $V_2$ of the wrapper V extend substantially radially outwardly from the drum 212.

FIG. 14 shows that the hub 212b of the drum 212 is secured to a gear 245 which forms part of the means for driving the wrapping drum. The hub 212b is mounted on two spaced needle bearings 247, 248 which are carried by the stationary shaft 249. The means for rotating the gear 245 is not shown in the drawings. The shaft 249 is fixed to and extends from a wall 244 which forms part of the frame for the apparatus of FIG. 14. This wall also supports a cupped cover 258 whose bottom portion extends between the gear 245 and the web 226 and carries an annular housing 256 which is formed with the aforementioned evacuated chamber 254a. The web 226 carries a slide ring 255 which seals the open side of the chamber 254a and into which the channels 225 extend so that they may communicate with the chamber 254a in certain angular positions of the drum 212. The chamber 254a communicates with a conduit 257 which extends through the cover 258 and through the wall 244 and which is connected to suitable vacuum generating means (not shown) so as to produce subatmospheric pressure in the chamber 254a. The length of the arc along which the chamber 254a extends in the annular member 256 is shown in FIG. 12. This annular member is formed with two additional chambers 254b, 268.

The wrapping members 229, 230 of FIGS. 13 and 14 are operated as follows:

The groups G which are delivered by the transfer drum 211 (FIG. 12) are consecutively admitted to the grooves 259 of the trays 222 so that the wrappers V come to rest in the grooves 228 of the respective wrapping members 229. The tray which receives a group G at the first transfer station a then travels along the zone A (FIG. 12) in which its channel 223 communicates with the evacuated chamber 254a through the channel 225 and through the aligned extension of this channel in the slide ring 255. The edge portions $V_1$, $V_2$ of the wrapper V extend outwardly and beyond the groove 259 of the respective tray 222 so that the edge portion $V_2$ is in the path of the outer wrapping member 230. The group G is retained in its tray by suction since the channel 223 is free to communicate with the evacuated chamber 254a as long as the tray travels along the zone A.

Once the tray 222 leaves the zone A and enters the next zone B (FIG. 12), the channel 223 is sealed from the chamber 254a so that the group G is not sucked into the groove 259 and that the group G is free to roll in the tray under the action of the outer wrapping member 230 which is caused by its cam 242 to move in a direction to the left, as viewed in FIG. 13, and to fold the edge portion $V_2$ into contact with the filter M as well as with the adjacent inner end portions of the sticks Z, Z. The group G is now retained by the inner face of the wrapping member 230 which presses it against the wall bounding the groove 259 as well as against the wall bounding the groove 228 of the wrapping member 229. In the next step, the cam 241 causes the wrapping member 229 to move in a direction to the right, as viewed in FIG. 13, and to lift the group G from the groove 228 so that the group is pressed with a greater force against the inner face of the member 230. At the same time, the slightly lifted group G begins to turn about its own axis so as to fold the edge portion $V_1$ onto the filter M. During such rightward movement of the wrapping member 229, the cam 242 causes the outer wrapping member 230 to continue its movement in the opposite direction so that the group G rolls between the inner and outer faces of oppositely moving wrapping members to automatically convolute the edge portion $V_2$ onto the filter and onto the adjacent end portions of the sticks Z, Z. In the next step (but still in the zone B), the cams 241, 242 respectively cause the wrapping members 229, 230 to return to the positions of FIG. 13 so as to release the group G by permitting it to return into the groove 228.

The tray 222 then enters the next zone C (FIG. 12) in which the channel 223 communicates with the next evacuated chamber 254b so that the group G with a fully convoluted wrapper V thereon is retained by suction as soon as this group is released by the respective wrapping members. The group is retained by suction all the way to the transfer station i where it is delivered into a pocket of the drum 213. Before returning into the zone A, the tray 222 travels through a zone D in which the channel 223 communicates with a third chamber 268 connected with a conduit 269 which leads to a source of compressed gas and whose purpose is to automatically clean the groove 259 and the slot 260 by blowing away any impurities which might have remained in the tray upon removal of the group G. The tray then returns to the transfer station a where it receives a new group G with a partially applied wrapper V to thereupon advance into the zone A where the wrapping operation is repeated in the above described sequence.

Figures 15, 16, 17:
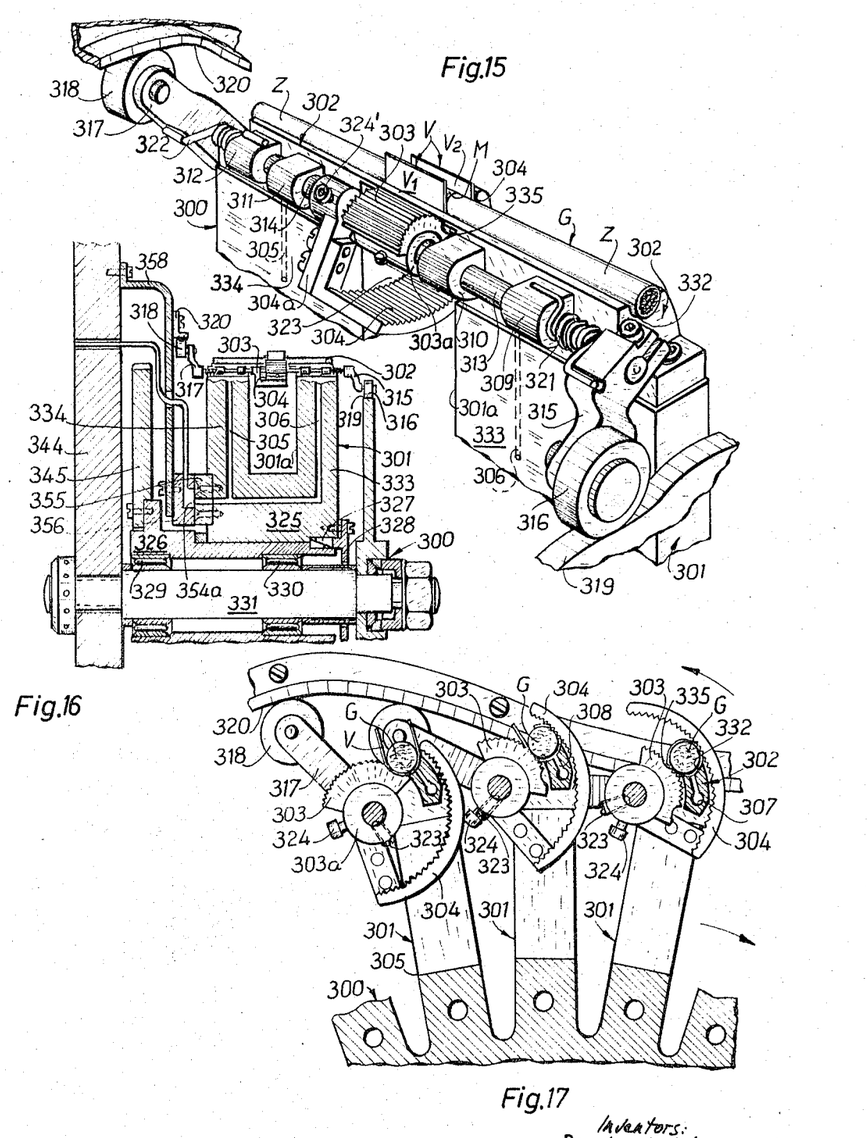
FIG. 15 is a fragmentary perspective view of a modified wrapping drum which is provided with differently configurated and pivotably mounted wrapping members.
FIG. 16 is a fragmentary axial section through the wrapping drum of FIG. 15.
FIG. 17 is an enlarged fragmentary transverse section through the wrapping drum of FIGS. 15 and 16.

FIGS. 15 to 17 illustrate a different conveying means in the form of a wrapping drum 300 which carries a plurality of pairwise arranged arcuate wrapping members 303, 304. The drum 300 is provided with axially parallel radially outwardly extending partitions or walls 301, one for each pair of wrapping members 303, 304, and each partition is formed with a centrally located outwardly opening cutout 301a.

The outer end face of each partition 301 carries an axially parallel supporting means or tray 302 which is provided with an outwardly facing groove 332 for a group G. The median portion of each tray 302 is formed with a lateral cutout 335 (FIG. 17) whose length exceeds the length of a wrapper V, and each tray is formed with a longitudinally extending suction channel 307 which extends beyond both ends of the cutout 335. This channel communicates with the groove 332 through a series of spaced ports 308 and is in communication with an evacuated chamber 354a (FIG. 16) through a pair of connecting channels 305, 306 provided in the respective partition 301. Thus, when the slide ring 355 which is connected with the drum 300 and which seals the open side of the chamber 354a permits the ports 308 to communicate with this chamber, the group G momentarily supported by the tray 302 is held by suction against the wall bounding the groove 332 to make sure that the group remains in the groove even if it is not engaged by the wrapping members 303, 304.

Inwardly adjacent to the respective tray 302, each partition 301 carries two pairs of bearing brackets 309, 310 and 311, 312 which are disposed at opposite axial ends of the cutout 335 and which respectively support aligned shafts 313, 314 so that the shafts are free to rotate in their brackets. The shafts 313, 314 are parallel with the shaft 331 of the drum 300. The length of the shaft 313 approximates the length of the right-hand portion 333 of the partition 301, and the axial length of the shaft 314 approximates the axial length of the left-hand portion 334 of this partition.

The supporting means or hub 303a of the wrapping member 303 is detachably connected with the shaft 313 by means of a screw 324 (see FIG. 17). The other wrapping member 304 is provided with a supporting means in the form of a lateral lug which is secured to a plate 304a provided with a hub slidable along and secured to the shaft 314 by a screw 324'. The points of connection between the members 303, 304 and the shafts 313, 314 are respectively adjacent to the opposite axial ends of the cutout 335.

The outer end of the shaft 313 carries a link 315 which supports a follower roller 316 engaging with the face of a cam 319 which is non-rotatably secured to the shaft 331 (FIG. 16). The roller 316 is permanently biased into engagement with the cam 319 by a helically convoluted torsion spring 321 which is mounted on the shaft 313 and operates between the bracket 309 and the link 315 so as to bias the link in an anticlockwise direction, as viewed in FIG. 15.

The outer end of the shaft 314 carries a link 317 for a follower roller 318 which is biased into engagement with the face of a fixed cam 320 by a torsion spring 322, the latter operating between the link 317 and the bearing bracket 312 in a sense to bias the link 317 in a clockwise direction, as viewed in FIG. 15. It will be noted that the means 309, 310, 313, 315, 316, 319, 321 which support and reciprocate the inner wrapping member 303 are arranged in mirror symmetry with the means 311, 312, 314, 317, 318, 320, 322 for supporting and reciprocating the wrapping member 304.

The hub 325 of the drum 300 is secured to a coaxial sleeve 326 by means of wedges 327 and the sleeve 326 rotates on needle bearings 329, 330 provided on the shaft 331 which is fixed to the machine frame 344. The cam 320 is secured to the cover 358 which, in turn, is removably secured to the frame 344.

FIG. 17 shows that the inner face of each outer wrapping member 304 is of concave shape and that each inner wrapping member 303 is formed with a convex outer face. These faces define between themselves an arcuate space in which the group G rolls during a wrapping operation. The difference in radii of these faces is preferably slightly less than the diameter of a filter M. As shown in FIG. 15, the wrapping member 303 is adjacent to the median portion of the associated tray 302 so that its outer face constitutes a continuation of the wall bounding the groove 332. This wrapping member assumes the form of a segment and its outer face is at least partially overlapped by the inner face of the wrapping member 304 when these wrapping members support and rotate a group G therebetween. In FIG. 15, the wrapping members 303, 304 are shown in idle position in which they expose the groove 332 of the associated tray 302 and in which a portion of the wrapping member 304 extends into the cutout 301a of the respective partition 301.

The wrapping drum of FIGS. 15 to 17 operates as follows:

The groups G delivered by a transfer drum (e.g., the drum 211 of FIG. 12) are deposited in the grooves 332 of the consecutive trays 302 when the drum 300 is driven by the gear 345, and the groups G are retained in their trays by suction because the wrapping members 303, 304 are assumed to be in the position of FIG. 15 in which the outer wrapping member does not overlap the inner wrapping member and the edge portions $V_1$, $V_2$ of the strip V extend substantially radially outwardly from the mantle of the wrapping drum. In other words, when a group G is transferred into the tray 302 of FIG. 15, the channels 305, 306 communicate with the chamber 354a of the annular member 356 and continue to communicate with this chamber while the tray advances through an angle corresponding to the length of the zone A shown in FIG. 12. When the tray 302 enters the zone B, the slide ring 355 seals the channels 305, 306 from the chamber 354a and the wrapping member 304 begins to move from the position of FIG. 15 toward and beyond the position shown in the center of FIG. 17, i.e., its inner face begins to roll the edge portion $V_2$ onto the filter M. The wrapping member 303 then moves in the opposite direction so that it bends the edge portion $V_1$ into contact with the filter M. The sequence in which the edge portions $V_1$, $V_2$ are folded into contact with the group G is shown in FIG. 17. The wrapping members 303, 304 are then returned to the position of FIG. 15 so as to expose the group G with a fully convoluted wrapper thereon at the time when the tray 302 reaches the zone C so that the channels 305, 306 communicate with the next evacuated chamber (corresponding to the chamber 254b of FIG. 12) and the group G is held by suction until the tray reaches the second transfer station. The tray then advances to the zone D so that compressed air may expel any solid particles which might have remained in the groove 332. In the embodiment of FIGS. 15 to 17, the paths of the pivotable or rockable wrapping members are inclined with respect to the paths of the associated trays.

It will be readily understood that the wrapping apparatus of my invention is equally useful for applying adhesive wrappers about the meeting ends of a single tobacco-containing stick and an abutting filter, about the meeting ends of two filters, or about groups consisting of three or more end-to-end arranged filters. In other words, it is not necessary that one of the components actually contain tobacco since the sticks Z, Z could be replaced by filter tips if the nature of the ultimate products is such that they must be provided with composite filter tips. The radially reciprocable wrapping members 11–11a, 11'–11a' or 111–111a are preferred when the trays are closely adjacent to each other so that there is no room for tangential or pivotal movements of the wrapping members.

Figure 18:
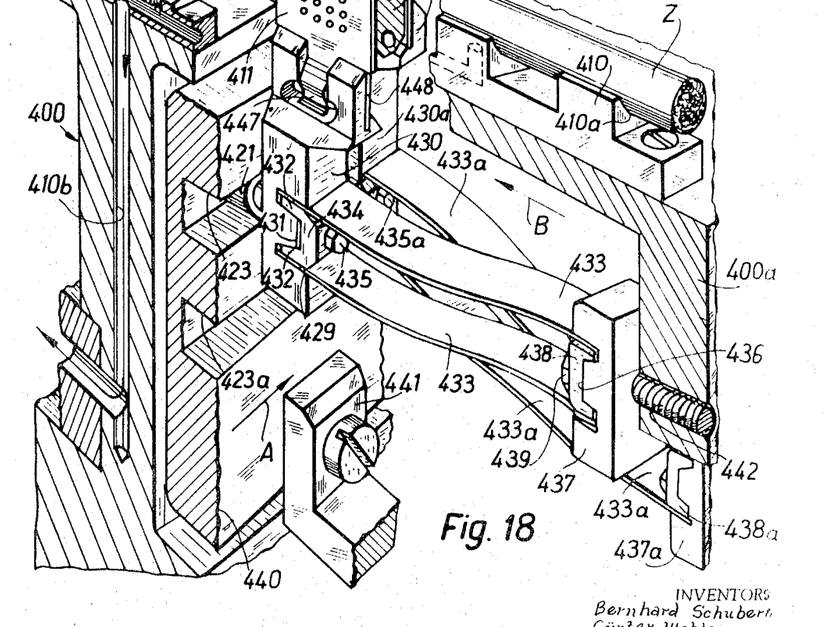
FIG. 18 is a fragmentary perspective view of an additional wrapping drum whose wrapping members are mounted on resilient supporting means.

FIG. 18 illustrates a wrapping drum 400 whose periphery is provided with axially parallel holding means or trays 410 (only one shown). Each tray 410 cooperates with a pair of plate-like wrapping members 411, 411a which are provided with perforations 444 in the same way as the wrapping members 111, 111a of FIGS. 8, 9 and 11. Each wrapping member 411, 411a comprises a resilient lip 447 and two flat extensions 448 to be detachably connectable with its supporting means in a manner as fully described in connection with FIG. 9. The wrapping members 411, 411a are reciprocable in planes which are parallel with the axis of and which extend radially with respect to the wrapping drum 400. The supporting bracket 430 for the wrapping member 411 of FIG. 18 is provided with a cutout or recess 431 having two radially spaced wedge-shaped sections 429 of diminishing width each of which receives the left-hand end of one of two elongated flat strip-shaped torsion-resistant springs 433, the other ends of these springs being received in radially spaced wedge-shaped sections of a second recess 436 provided in the inner face of a block 437 secured to the right-hand end wall 400a of the drum 400. A U-shaped clamping member 434 has a pair of wedge-shaped legs 432 which extend into the sections 429 to clamp the left-hand ends of the springs 433 in the recess 431. The clamping member 434 is secured to the supporting bracket 430 by a bolt 435. A second clamping member 438 clamps the right-hand ends of the springs 433 in the recess 436 by means of bolts 439.

Figure 20:
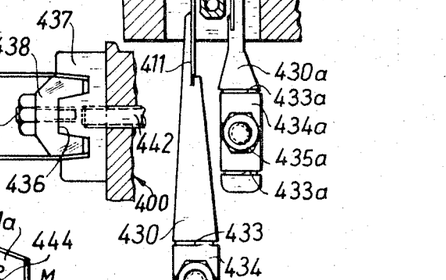
FIG. 20 is an end view of two wrapping members as seen in the direction of arrow B in FIG. 18.

The supporting bracket 430a for the other wrapping member 411a is connected with the left-hand ends of two flat strip-shaped springs 433a in the same way as described in connection with springs 433, only the bolt 435a and the clamping member 434a being visible in FIGS. 18 and 20. The right-hand ends of the springs 433a extend into a cutout or recess provided in a second block 437a fixed to the end wall 400a and are secured to the block 437a by a clamping member 438a. The springs 433, 433a are substantially parallel with the axis of the drum 400 and each thereof has an outer side facing the holder 410.

Figure 19:
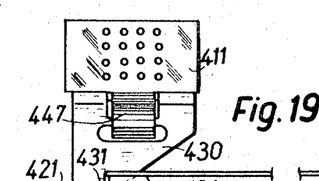
FIG. 19 is a smaller-scale view of a detail as seen in the direction of arrow A in FIG. 18, showing the resilient supporting means in unstressed condition.

The left-hand end portion of the bolt 435, as viewed in FIGS. 18 and 19, carries a follower roller 421 which is free to rotate about its axis. This roller extends into an endless groove 423 provided in the right-hand face of a reciprocating means here shown as a fixed cam 440. The bolt 435a carries a second follower roller (not shown) which extends into a second endless groove 423a of the cam 440. As shown in FIG. 18, the cam 440 is secured to a bracket 441 which forms part of the machine frame.

The wrapping drum 400 of FIGS. 18 to 20 operates as follows:

A group G including two tobacco-containing sticks Z, Z, a filter M and a wrapper V has been transferred into the holder 410 at the first transfer station corresponding to the station *a* in FIG. 2. This group is retained in the pocket 410a by suction prevailing in a system of channels and ducts 410b which communicate with an evacuated chamber (not shown) similar to the chamber 254a of FIG. 14.

As the drum 400 rotates about its axis, the cam 440 cooperates with the rollers 421 of the respective supporting brackets 430, 430a to move the wrapping members 411, 411a toward and away from the axis of the drum 400 in a sequence determined by configuration of the cam grooves 423, 423a whereby the inner faces of the wrapping members roll the edge portions of the wrapper V onto the filter M and onto the adjacent portions of sticks Z, Z in the same manner as described in connection with FIGS. 6a–6i. Radial movements of the wrapping members take place against the bias of the springs 433, 433a which are deformed whenever the followers move the wrapping members radially inwardly or outwardly.

The springs 433, 433a serve as a means for guiding the brackets 430, 430a in substantial parallelism with themselves radially toward and away from the axis of the drum 400 due to the spring movement. Minimal displacements of wrapping members 411, 411a in the axial direction of the drum 400 have no bearing on the wrapping operation since the radial displacements of these wrapping members (and hence the axial displacement of brackets 430, 430a) are comparatively small.

The supporting brackets 430, 430a, the springs 433, 433a, the clamping members 434, 434a, 438, 438a and the blocks 437, 437a, constitute the sole supporting means for the wrapping members 411, 411a, i.e., the wrapping drum 400 need not be provided with stops such as the stops 26, 27 or 142, 142a. This is due to the fact that the springs 433, 433a automatically prevent undesirable movements of wrapping members 411, 411a in circumferential direction of the drum 400, i.e., the distance between the wrapping members remains practically unchanged.

By partly unscrewing the connecting bolt 435 and/or 439, an operator can change the effective length of the springs 433 in order to adjust the distance between the wrapping member 411 and the end wall 400a. The distance between the wall 400a and the other wrapping member 411a may be adjusted in similar fashion. Such adjustments in the position of the wrapping members may become necessary if the drum 400 is converted for use with a different type of tobacco-containing products. Additional adjustments in the position of the wrapping members 411, 411a with respect to the drum 400 may be carried out upon loosening of connecting bolts 435, 435a. These connecting bolts enable an operator to move the wrapping members into two spaced planes which are parallel with the axis of the drum 400.

As best shown in FIG. 19, the bolt 439 merely connects the clamping member 438 with the block 437, whereas the connection between the block 437 and wall 400a comprises a further bolt 442 which is accessible from the outer side of the wall 400a and which enables an operator to adjust the inclination of the wrapping member 411 with respect to the wrapping member 411a. Of course, a bolt similar to the bolt 442 connects the other block 437a to the wall 400a in order to facilitate adjustments in the inclination of the wrapping member 411a. An important advantage of bolts 442 is that they permit adjustments in the inclination of wrapping members 411, 411a without loosening of the clamping members 438.

The connecting bolts 435, 435a, 439 and 442 permit universal adjustments in the position of wrapping members 411, 411a with respect to each other, with respect to the drum 400, and with respect to the associated holding means 410. Such universal adjustability of the wrapping members enables an operator to select the position of these members with utmost precision and to thus insure that each wrapper is rolled tightly about the respective filter and about the adjacent end portions of the tobacco-containing sticks.

An important advantage of the wrapping drum 400 is that the wrapping members 411, 411a and the supporting means 430, 433 and 430a, 433a are subjected to negligible wear and tear because the drum need not be provided with stops which would rub against the wrapping members or against their supports. It can be said that the means 430, 433 and 430a, 433a floatingly support the respective wrapping members in such a way that the roller followers 421 may track the walls bounding the endless grooves 423, 423a of the cam 440 with little or no resistance offered by the springs 433, 433a, the pressure with which the springs 433, 433a bias the followers 421 against the walls of the grooves 423, 423a depending on the momentary radial position of the followers. Thus, when the springs 433, 433a are not deformed (FIG. 19), the followers 421 are not biased against the walls bounding the grooves 423, 423a.

The distance between the cooperating wrapping members 411, 411a should remain constant when the drum 400 is in actual use to make sure that each consecutive wrapper V is applied under identical pressure. The springs 433, 433a insure that the spacing between the wrapping members remains unchanged without, however, preventing radial displacements of the wrapping members in directions toward or away from the axis of the drum 400, such radial movements being caused by the fixed cam 440 when the wrapping drum rotates. Furthermore, the wrapping members 411, 411a and their supporting means are without any rotating parts which also contributes to a reduction in wear and tear upon the components of the wrapping drum. With the exception of the rotary followers 421, all other parts of the wrapping members and of their supporting means may be firmly connected to each other.

Some very small displacements of the wrapping members 411, 411a toward or away from each other are actually desirable if the diameters of the filters M are not uniform and/or if the tobacco particles contained in the sticks Z, Z are not compacted to identical degree of compression. Such minimal displacements of the wrapping members are possible in response to elastic deformation of springs 433, 433a in directions at right angles to the axis of the drum 400 and at right angles to the planes of the respective wrapping members (i.e., to the right or to the left, as viewed in FIG. 20). When the springs 433, 433a are not deformed, they extend in planes which are parallel with the axis of the drum 400. Such planes are perpendicular to a radial plane passing through the axis of the drum 400 and centrally through the pocket 410a of the associated holder 410. Each pair of springs 433, 433a may be replaced by a single spring if desired.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for the manufacture of tobacco-containing products of the type comprising at least two end-to-end arranged components and an adhesive wrapper which is convoluted about the meeting ends of and connects the components to each other, in combination, a rotary wrapping drum having a mantle; a plurality of spaced trays mounted on said mantle and having elongated outwardly opening groove means parallel with the axis of rotation of said drum; means for consecutively transferring wrappers and groups of end-to-end arranged components into said groove means so that a portion of each wrapper adheres to and that at least one edge portion of each wrapper extends from the respective group whereby the extent of contact between a group and the corresponding wrapper exceeds mere linear contact; a plurality of wrapping members radially movably mounted in said drum, one pair for each of said trays, the wrapping members of said pairs disposed at the opposite sides of the respective trays and having wrapper-engaging inner faces; a pair of stop means provided on each of said trays, one for each wrapping member; means for biasing said wrapping members into abutment with the respective stop means; and means for radially reciprocating said pairs of wrapping members with respect to said drum and with respect to each other so as to roll the groups along the inner faces of the respective wrapping members and to convolute the edge portion of each wrapper about the respective group while the groups rotate in their groove means solely in response to reciprocation of the wrapping members, said reciprocating means comprising cam-operated link and lever means for each of said wrapping members.

2. A combination as set forth in claim 1, wherein said stop means are rollers rotatably mounted on the respective trays.

3. In an apparatus for the manufacture of tobacco-containing products of the type comprising at least two end-to-end arranged components of substantially circular cross section and a wrapper having an adhesive-coated side and being convoluted about the meeting ends of such components to connect the same with each other, a rotary wrapping drum having a plurality of equidistant peripheral grooves extending in the axial direction thereof; means for transferring wrappers and groups of end-to-end arranged components into consecutive grooves so that a median portion of each wrapper adheres to the respective group and simultaneously abuts against the surface bounding the corresponding groove and that both edge portions of the wrapper extend from the respective group; a plurality of wrapping members radially reciprocably mounted in said drum, there being one pair of wrapping members for each groove and the wrapping members of each pair being disposed at the opposite sides of the respective groove; pressing means for temporarily pressing the groups into the respective grooves; and means for reciprocating said wrapping members with respect to said drum and with respect to each other in such sequence that the wrapping members of each pair are held in radially innermost positions during transfer of wrappers into the respective grooves, that both wrapping members thereupon simultaneously move outwardly to partially convolute the edge portions of the respective wrapper around the associated group while such group is engaged by said pressing means, that both wrapping members thereupon again simultaneously move outwardly to lift the corresponding wrapper and the associated group out of direct engagement with the drum, that the wrapping members thereupon move with reference to each other to complete the wrapping of the edge portions around the associated group, and that the wrapping members are finally withdrawn to their innermost radial positions so as to permit transfer of the thus wrapped groups from said drum onto another carrier.

References Cited by the Examiner
UNITED STATES PATENTS

| | | | |
|---|---|---|---|
| 249,833 | 11/1881 | Hart | 131—27 X |
| 623,407 | 4/1899 | Lacoste | 131—27 X |
| 809,415 | 1/1906 | Webb | 100—176 X |
| 970,011 | 9/1910 | Boucher | 131—95 |
| 2,166,486 | 7/1939 | Edwards. | |
| 2,714,384 | 8/1955 | Schubert | 131—94 |
| 2,779,339 | 1/1957 | Pollmann | 131—94 |
| 2,881,767 | 4/1959 | Richter | 131—94 |
| 2,902,040 | 9/1959 | Korber et al. | 131—94 |

SAMUEL KOREN, *Primary Examiner.*

H. P. DEELEY, JR., *Assistant Examiner.*